Nov. 8, 1927.
W. R. SCOTT
1,648,828
AUTOMATIC STARCHER FOR RAW GUM MATERIAL
Filed Nov. 5, 1924   3 Sheets-Sheet 1
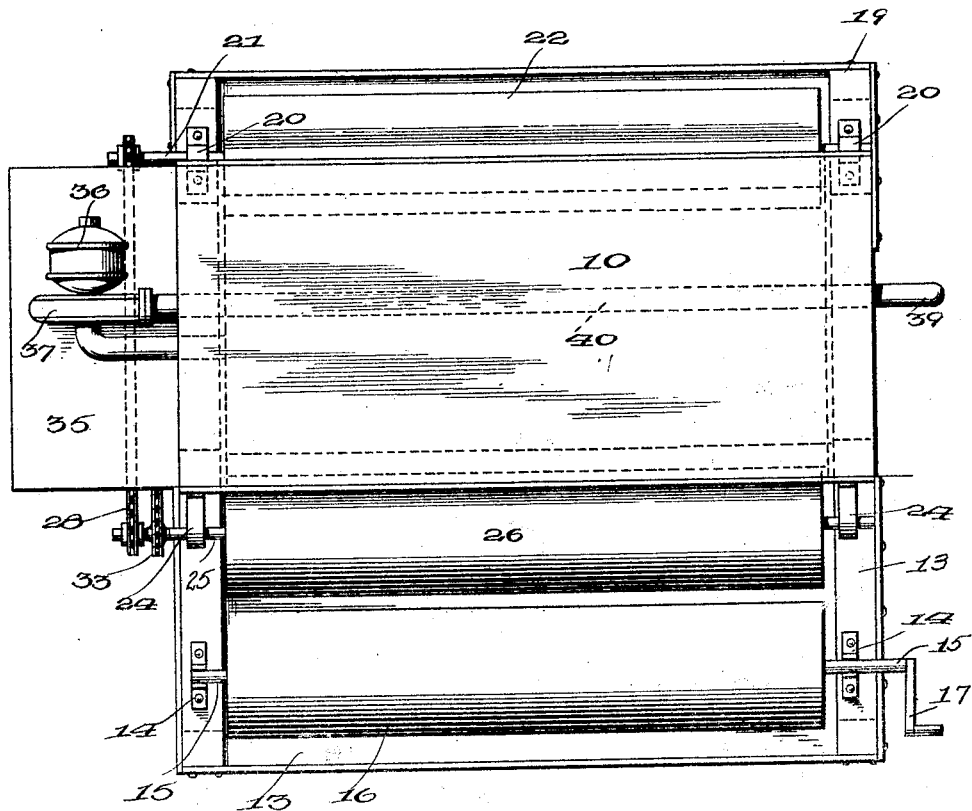
Fig. 1.
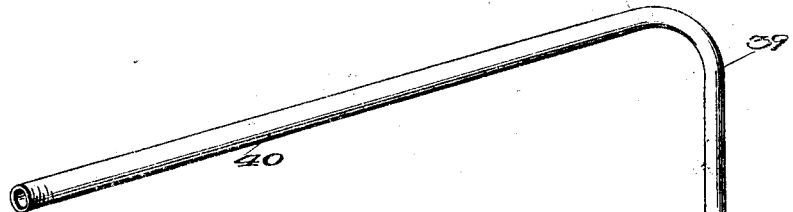
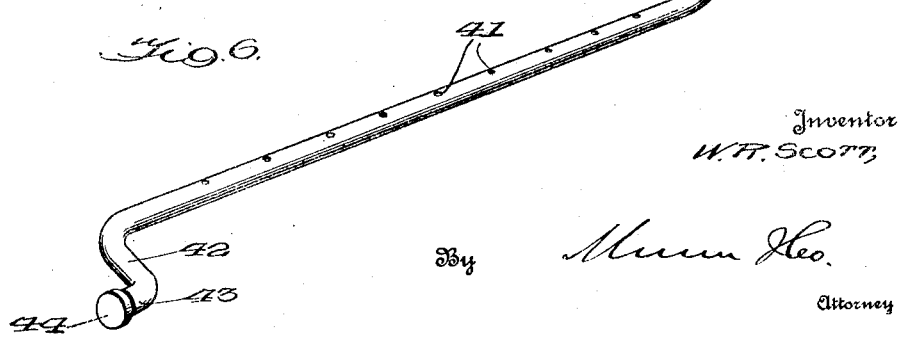
Fig. 6.
Inventor
W. R. Scott,
By Munn & Co.
Attorney Nov. 8, 1927.

W. R. SCOTT 1,648,828

AUTOMATIC STARCHER FOR RAW GUM MATERIAL

Filed Nov. 5, 1924     3 Sheets-Sheet 2

INVENTOR
W. R. Scott,

BY

ATTORNEYS

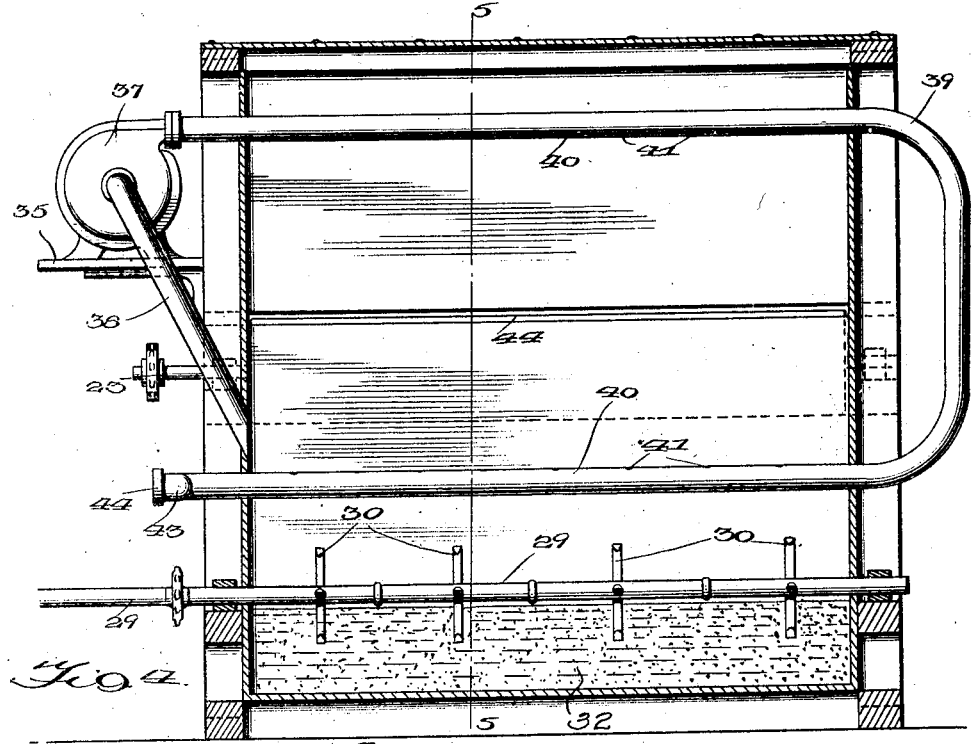

Patented Nov. 8, 1927.

1,648,828

UNITED STATES PATENT OFFICE.

WILLIAM RICHARD SCOTT, OF SPRINGDALE, CONNECTICUT, ASSIGNOR OF ONE-HALF TO EDWARD STEVENSON, OF SPRINGDALE, CONNECTICUT.

AUTOMATIC STARCHER FOR RAW-GUM MATERIAL.

Application filed November 5, 1924. Serial No. 747,951.

This invention relates to an apparatus for dusting raw gum or rubber when in sheet form such as taken from a calender. This sheet rubber or gum must be dusted on both sides, preferably with starch or the like, and it is the primary object of the present invention to provide an apparatus whereby sheet rubber of the character referred to may be dusted on both sides in a continuous and uniform manner.

It is a further object of the invention that the apparatus be simple in construction and operate for dusting sheet gum or rubber in a rapid manner.

Other objects and objects relating to details of construction, combination and arrangements of parts will hereinafter appear.

The invention is illustrated by way of example in the accompanying drawings, in which:

Figure 1 is a top plan view of the apparatus,

Figure 4 is a sectional view taken substantially on the line 4—4 of Figure 5,

Figure 5 is a sectional view taken substantially on the line 5—5 of Figure 4,

Figure 6 is a perspective view of the blower pipe, and

Figure 7 is a perspective view of a spike or agitator element employed.

Figure 2:
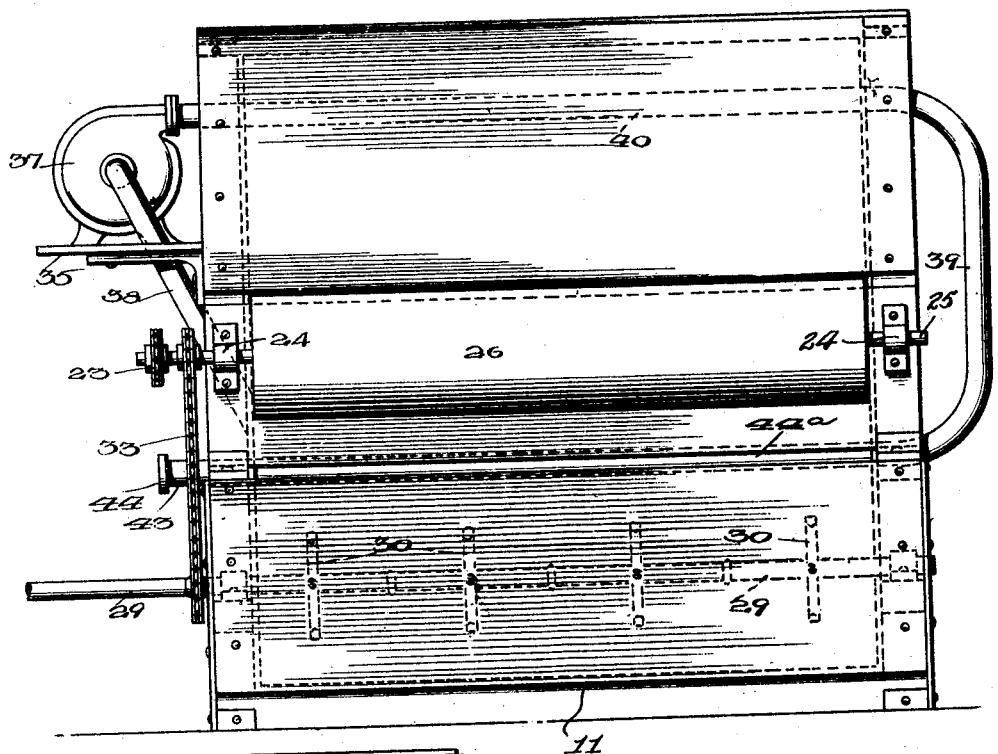
Figure 2 is a view in front elevation of the same.

Referring to the drawings more particularly, a housing generally indicated by the reference numeral 10 is provided which may be formed by suitable uprights and walls supported thereby as plainly shown in the drawings. The housing 10 preferably tapers toward its bottom as best shown in Figure 5. The housing may be supported upon suitable sills as shown. The bottom 11 of the housing 10 extends forwardly from the housing as at 12 and upon this extended bottom portion there is provided a box-like structure generally indicated by reference numeral 13. Bearings 14 are mounted upon the box structure 13 and these bearings journal a shaft 15 which supports a drum 16. The one end of shaft 15 is extended and has fixed thereon a crank 17 by which the same may be manually rotated.

The rear end of the housing bottom 11 is also extended as at 18 and this extended portion supports a frame-like structure generally indicated at 19. The frame structure 19 supports the bearings 20 which journal a shaft 21 carrying a drum 22. One end of the shaft 21 is extended and has fixed thereon a sprocket wheel 23.

Figure 3:
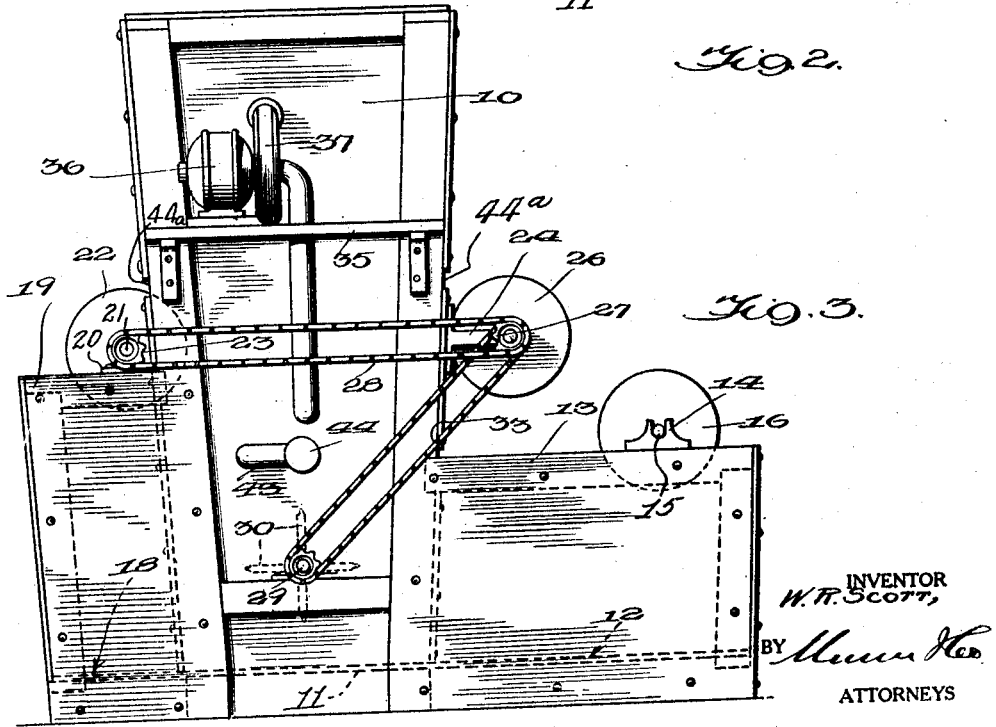
Figure 3 is a view in side elevation of the same.

Upon the forward wall of housing 10 there is suitably mounted a pair of brackets 24 each formed with a bearing at the free end thereof for suitably journaling a shaft 25 which has fixed thereon a drum 26. One end of the shaft 25 is extended and carries a sprocket wheel 27. About the sprocket wheels 23 and 27 there is trained a sprocket chain 28. A shaft 29 is suitably journaled by the side walls of the housing 10 and preferably arranged parallel with the drums 22 and 26. The shaft 29 is located near the bottom of the housing and carries a plurality of radially extending spikes or agitator members 30 which may be arranged upon the shaft in any desirable manner. Each spike or agitator member preferably comprises a short section of a rod or pipe having its one end threaded into the shaft 29 and its other end flattened as at 31, Figure 7. The bottom of the housing 10 serves as a hopper for the reception of corn starch or other powdered substance which may be used for carrying out the purpose of the present apparatus. Such powdered substance is indicated at 32 in Figures 4 and 5 of the drawings, and this powdered substance or material should be maintained at such a height in the housing 10 that with the rotation of shaft 29 the members 30 will cause quantities of the powdered substance to rise in the form of a dust within the housing 10. The flattened ends of members 30 are so designed that with rotation of shaft 29 small quantities of the powdered material will be picked up by each member 30 and thrown upwardly and in this way cause a dust to rise within the housing 10. The shaft 29 may be driven by an electric motor or other suitable power means, and if convenient the shaft 29 can be connected to shaft 25, Figure 3, through a sprocket chain 33 and suitable sprocket wheels fixed upon shafts 25 and 29.

Upon the rear wall of the housing 10 there is supported by suitable brackets a platform 35 which carries an electric motor 36. The motor 36 is properly connected for driving a blower 37. The blower 37 is preferably of the type shown and its inlet communicates with the one end of a pipe 38, the other end of said pipe communicating with the interior of the housing 10 preferably at the place or point shown. The discharge end of blower 37 communicates with the one end of a substantially U-shaped pipe 39, the leg portions 40 of said U-shaped pipe 39 being arranged to extend one above the other transversely across the space within the housing 10 and substantially parallel with the drums 22 and 26. Each leg portion 40 of the U-shaped member 39 has its inner side provided with perforations 41. The free end of the U-shaped pipe 39 is preferably formed with a substantially right angular end portion 42 which terminates in an end portion 43 disposed in offset relation to portion 41. A cap 44 is threaded upon the end portion 43.

A slot 44ᵃ is provided in both the front and rear walls of the housing 10 in order to permit the passage of sheet material over drums 22 and 26.

In the use of the present apparatus the one end of a sheet of raw gum or rubber may be taken from a calender and passed over the drum 22 between the legs of the U-shaped discharge member 39, over the drum 26, and then about drum 16 and if necessary secured to the last named drum. By rotating the drum 16 the sheet of gum or rubber will move over the drums 22 and 26 and be wound upon drum 16. Previous to rotating drum 16 power should be applied for rotating shaft 29 which in turn will through sprocket chains 33 and 28 rotate drums 26 and 22 and aid in feeding the sheet of gum or rubber to the receiving drum 16. Also, the blower 37 should be set into operation at the time of starting the drums 22 and 26, and the shaft 29. With the rotation of shaft 29 the members 30 carried thereby will agitate the powdered substance or material 32 and cause a dust to rise within the housing 10. Some of this dust will settle upon the lower surface of the sheet of gum passing over the drums 22 and 26. The greater portion of this dust will, however, be drawn upwardly through the pipe 38 and forced into the U-shaped pipe 39 and through the perforations 41 of both leg portions 40 of said U-shaped pipe. Both sides of the sheet of gum or rubber will in this manner be thoroughly and uniformly dusted with the powdered substance 32.

It should also be pointed out that the present apparatus is adapted for dusting sheet gum or rubber which is exceedingly thin such as used in the manufacture of bathing caps or the like. It has been found that a continuous sheet of raw gum or rubber can be dusted on both sides in a rapid manner and the operation carried on without shrinkage of the material being dusted.

While I have shown and described the preferred embodiment and use of my invention it is to be understood that I am aware of the fact that the same is capable of other similar uses and that slight changes might be made in the structure, combination, and arrangement of parts of my apparatus without departing from the spirit of my invention as indicated by the appended claims.

I claim:

1. An apparatus of the character described comprising a housing adapted to hold powdered material in the bottom of the housing, means whereby the powdered material may be agitated to form a dust from said material, means whereby sheet material may be continuously fed through the housing, a U-shaped pipe having its leg portions disposed within the housing and parallel to the sheet of material, said leg portions being perforated, and one of the leg portions having its free end closed, a blower communicating at its inlet with the interior of the housing and having its discharge or outlet connected with the free end of the other or remaining leg portion of said U-shaped pipe.

2. An apparatus of the character described comprising a housing adapted to hold powdered material in the bottom of the housing, blades for agitating the material to form a dust in the housing, means for continuously feeding sheet material to the housing, perforated pipes located upon opposite sides of the sheets of material, a blower in communication with the perforated pipes, a pipe connecting the housing adjacent the bottom with the perforated pipes so that when the blower is operated and the powdered material is agitated to form a dust, said dust will be drawn through the last mentioned pipe and forced through the perforated pipe and onto the sheet material.

WILLIAM RICHARD SCOTT.